March 18, 1958     J. DIENER     2,827,045
INTERDENTAL PAPILLAE STIMULATOR
Filed Oct. 29, 1956
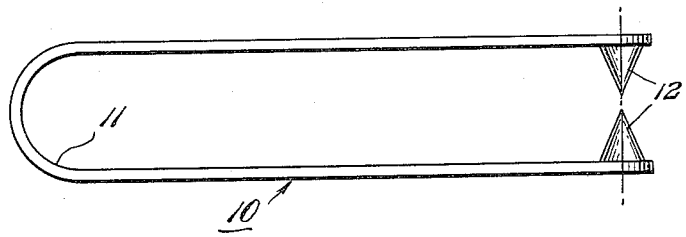
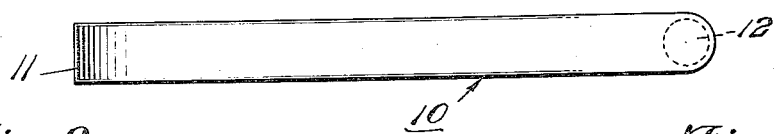
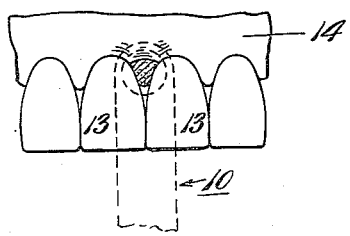
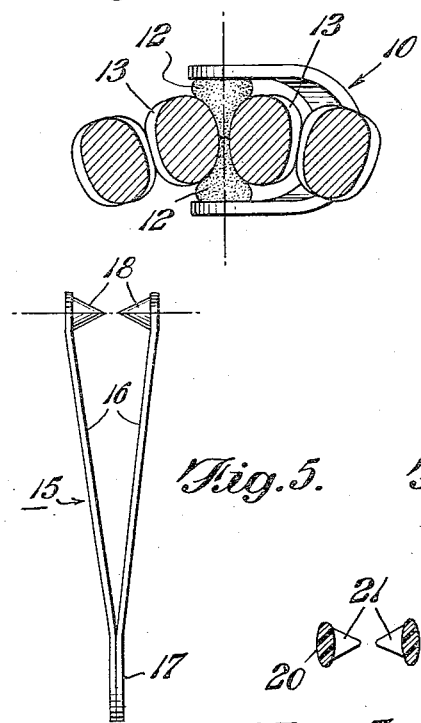
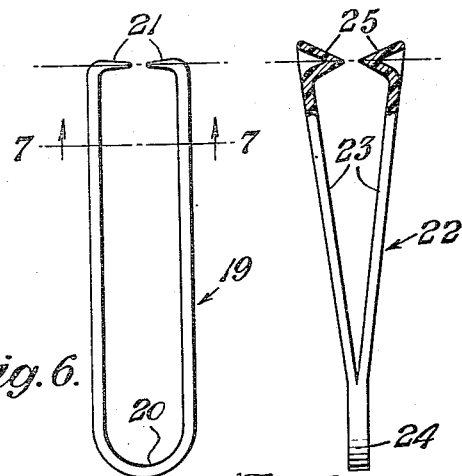
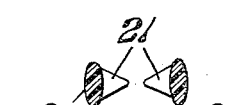
INVENTOR
Jack Diener,
BY Karl W. Flocks
ATTORNEY United States Patent Office 2,827,045
Patented Mar. 18, 1958

2,827,045

INTERDENTAL PAPILLAE STIMULATOR

Jack Diener, Washington, D. C.

Application October 29, 1956, Serial No. 618,738

2 Claims. (Cl. 128—62)

This invention relates to devices for stimulating interdental papillae and more particularly to simple tools which can be used by anyone for engaging the interdental papillae simultaneously from both the front side and the rear side of the teeth, particularly at the gum line and between the teeth.

Prior to the instant invention it has been recommended that the gums be stimulated particularly for the prevention and treatment of pyorrhea and the importance of the stimulation of the interdental papillae is known. For example, it is known that those people who eat coarse foods which stimulate the interdental papillae are not likely to suffer from pyorrhea whereas among civilized groups, and particularly with respect to those people who, as a rule, eat soft foods, such as ground or completely processed foods, are more likely to suffer from pyorrhea.

Prior to the instant invention, dentists have recommended that patients stimulate their gums with either their fingers or with multi-pronged devices slipped on their fingers or with a single pronged device on the end of a toothbrush handle, but it has been found that such prior devices and procedures do not effect sufficient stimulation of the interdental papillae for the reason that such prior devices and methods are either inconvenient to use and follow or they are ineffective to produce the results desired as is evidenced by the continuing symptoms of pyorrhea even with respect to those patients who have been taught such prior methods and how to use such prior devices.

It is an object of the instant invention to provide a simple device which will automatically line up its elements for interdental stimulation of the papillae from both the front and the rear sides of the teeth at the gum line and can be manipulated by the user with ease to effect the proper and desired result.

It is a further object of the instant invention to provide a simple and inexpensive device which will apply the proper stimulating pressures in the desired places to effect stimulation of the interdental papillae.

It is another object of the invention to provide a one-piece, two-armed tool provided with coaxial and facing stimulating elements.

Other objects and the nature and advantages of the invention will be apparent from the following description taken in conjunction with the accompanying drawings, wherein:

Figure 1 is a plan view of a device in accordance with the invention.

Fig. 2 is a view in side elevation of the device illustrated in Fig. 1.

Fig. 3 is a schematic fragmentary view in elevation of some upper teeth and a corresponding gum portion illustrating the device shown in Fig. 1 (in dotted lines) in action as an interdental gum stimulator.

Fig. 4 is a schematic view of some upper teeth shown in horizontal section, with the section taken below the gum line and with the device illustrated in Fig. 1 in plan view and in position between two teeth and above the plane where this section is taken and with the device illustrated in Fig. 1 under some compression.

Fig. 5 is a view in elevation of a modified form of the invention.

Fig. 6 is a view in elevation of a second modified form of the invention.

Fig. 7 is a view in horizontal section taken along line 7—7 of Fig. 6 and looking in the direction of the arrows.

Fig. 8 is a view in elevation with parts shown in section of a third modified form of the invention.

Referring to Figures 1, 2, 3 and 4, the device 10 comprises a U-shaped member 11 which may be made of spring steel or resilient plastic or steel coated with plastic. There is provided at the ends of the legs of the U the inwardly directed coaxial flexible conically shaped interdental papillae stimulating elements 12. The coaxial mutually facing conical elements 12 are of flexible material such as rubber or plastic and it is these elements which fit between the teeth at the gum line that are utilized to stimulate the interdental papillae.

The elements 12 are always coaxial and there is no interference with their action by the U-shaped handle member 11 or by any other part of the device 10. As will readily be apparent the elements 12 can be brought together as shown in Fig. 4 simply by pressing together the two arms of the U-shaped member 11 and as the elements 12 are always coaxial when one element 12 is in the proper position the other element 12 is automatically brought into the proper position. After the elements 12 are in the proper position any motion of the member 11 will cause the elements 12 to stimulate the interdental papillae by applying pressure both from the front side of the teeth and the rear side of the teeth and it is this combined pressure action which is essential to the proper stimulation of the interdental papillae.

Referring to Fig. 5, the interdental papillae stimulator 15 comprises two arms 16 extending like the upper arms of the Y from a relatively short leg portion 17 and two stimulating elements 18 which extend inwardly and are flexible and coaxial as already described in connection with the elements 12 of the device 10. The arms 16 may be made of spring steel or plastic or plastic covered steel. It will readily be apparent and understood that the elements 18 may be brought together by applying pressure on the arms 16.

Referring to Figures 6 and 7, the interdental papillae stimulator 19 comprises a U-shaped member 20 having inwardly turned stimulating ends 21. The ends 21 are in alignment and in this sense are coaxial, they point toward each other and generally act as do the elements 12 of the device 10. The stimulator 19 may be fabricated entirely of a resilient plastic.

Referring to Fig. 8, the interdental papillae stimulator 22 may be injection molded in one piece entirely of a flexible plastic such as polyethylene, for example. The device 22 comprises a straight leg like base section 24 from which extends two arm-like members 23 at the ends of which are formed the conical stimulating members 25 which are in the shape of hollow cones coaxially aligned with their apexes pointing toward each other.

In utilization, the devices 10, 15, 19 and 22 perform the same or similar function. Each of these devices comprises a simple handle easily engaged by the user and at the operating ends of the respective devices the flexible pointed elements which are coaxially aligned are automatically in the right position when one of the elements is positioned to engage the interdental papillae and with respect to each of the devices simple pressure on the arms will be directed automatically to stimulate the interdental papillae from both the front and the rear simultaneously.

The devices 10, 15, 19 and 22 are self-positioning with respect to the interdental papillae to be stimulated and this is true when used in mouth areas which are difficult to observe and wherein it is difficult to predetermine the positioning of a device of this character. Not only are these devices in accordance with the instant invention self positioning, but they are inherently slip proof as the more pressure that is applied the less chance there is of slipping while with the use of a single unit gum massager the more pressure that is applied the more chance there is of slipping. The automatically self locking of the devices 10, 15, 19 and 22 in the vital areas which need stimulation is a significant factor and the devices 10, 15, 19 and 22 will massage the vital areas in considerably less than one-half the time required with a single unit gum massager and I have found that the same quantitative massage effect may be obtained in less than one-fourth the time previously required. Not only are the devices 10, 15, 19 and 22 more efficient but it makes the task of massaging the vital gum areas adjacent teeth which have spaces next to them a very simple one whereas with prior devices this was difficult.

The devices 10, 15, 19 and 22, though simple in shape, inexpensive to manufacture, and easy to use, are so proportioned and arranged with the stimulating elements so positioned that all the interdental papillae can be easily reached for proper stimulation to effect the desired result and I have found that these devices so act to produce the desired stimulation and obtain the desired results.

It will be obvious to those skilled in the art that various changes may be made without departing from the spirit of the invention and therefore the invention is not limited to what is shown in the drawings and described in the specification but only as indicated in the appended claims.

What is claimed is:

1. A device for stimulating the interdental papillae, comprising a resilient two-armed handle, two flexible stimulating members, one on the end of one of said arms and the other of said stimulating members being on the other of said arms, each of said stimulating members being tapered and being axially aligned with the other stimulating member, said stimulating members being tapered toward each other, said resilient handle being adapted to be pressed together to bring said stimulating members toward each other while in axial alignment particularly when one of said members is placed between two teeth on one side thereof at the gum line thereby bringing the other of said members automatically into position between the same two teeth at the other side thereof and at the gum line, each of said arms including a planular surface facing the opposite arm, each of said tapered stimulating members including a base in the plane of said planular surface on the arm on which it is mounted and the taper of each of said stimulating members continuing to said base whereby the stimulating members may be completely utilized for stimulation of the interdental papillae right up to the planular portions of the arms which support the stimulating members.

2. A device for stimulating the interdental papillae, comprising a resilient two-armed handle, two stimulating members, one on the end of one of said arms and the other of said stimulating members being on the other of said arms, each of said stimulating members being tapered and being axially aligned with the other stimulating member, said stimulating members being tapered toward each other, said resilient handle being adapted to be pressed together to bring said stimulating members toward each other while in axial alignment particularly when one of said members is placed between two teeth on one side thereof at the gum line thereby bringing the other of said members automatically into position between the same two teeth at the other side thereof and at the gum line, each of said arms including a planular surface facing the opposite arm, each of said tapered stimulating members including a base in the plane of said planular surface on the arm on which it is mounted and the taper of each of said stimulating members continuing to said base whereby the stimulating members may be completely utilized for stimulation of the interdental papillae right up to the planular portions of the arms which support the stimulating members, wherein said handle and said stimulating members are all of one piece of integrally molded plastic and wherein said stimulating members are hollow coaxially aligned generally cone shaped formations with each of the apexes of the stimulating members facing toward each other.

References Cited in the file of this patent

UNITED STATES PATENTS

| | | |
|---|---|---|
| 776,101 | Anderton | Nov. 29, 1904 |
| 1,829,271 | Freye | Oct. 27, 1931 |
| 2,112,184 | Vogan | Mar. 22, 1938 |
| 2,283,686 | McCune | May 19, 1942 |
| 2,354,780 | Stewart | Aug. 1, 1944 |